United States Patent [19]

DiFrancesco

[11] Patent Number: 5,194,969
[45] Date of Patent: Mar. 16, 1993

[54] METHOD FOR BORDERLESS MAPPING OF TEXTURE IMAGES

[75] Inventor: David DiFrancesco, San Francisco, Calif.

[73] Assignee: Pixar, Richmond, Calif.

[21] Appl. No.: 622,712

[22] Filed: Dec. 4, 1990

[51] Int. Cl.$^5$ .................. H04N 1/38; H04N 1/387; H04N 1/40
[52] U.S. Cl. .................. 358/463; 358/450; 358/448
[58] Field of Search .............. 358/400, 401, 403, 447, 358/448, 450, 463, 428, 433; 382/44, 67, 68, 56; 340/723, 728, 729, 730, 799; 395/125, 128, 129, 130, 134

[56] References Cited

U.S. PATENT DOCUMENTS

| | | | |
|---|---|---|---|
| 4,209,780 | 6/1980 | Fenimore et al. | 382/68 |
| 4,228,420 | 10/1980 | Fenimore et al. | 382/68 |
| 4,272,756 | 6/1981 | Kakumoto et al. | 382/67 |
| 4,615,013 | 9/1986 | Yan et al. | 395/130 |
| 4,796,201 | 1/1989 | Wake | 395/130 |
| 4,811,245 | 3/1989 | Bunker et al. | 395/129 |
| 4,821,212 | 4/1989 | Heartz | 395/126 |
| 4,855,934 | 8/1989 | Robinson | 395/130 |
| 4,887,228 | 12/1989 | Robert | 395/129 |
| 4,888,713 | 12/1989 | Falk | 340/729 |
| 4,940,309 | 7/1990 | Baum | 359/618 |
| 4,979,130 | 12/1990 | Li et al. | 340/730 |
| 4,984,181 | 1/1991 | Kliman et al. | 395/129 |
| 4,985,854 | 1/1991 | Wittenburg | 340/729 |
| 5,060,169 | 10/1991 | Khosla | 395/129 |

Primary Examiner—Stephen Brinich
Assistant Examiner—Thomas D. Lee
Attorney, Agent, or Firm—Hecker & Harriman

[57] ABSTRACT

A method of transformation of any random sample of a surface texture pattern into a replicatable unit for computer graphics applications that can join together without borders to cover any desired surface area. The present invention is particularly well suited for obtaining texture patterns from high resolution photographs of actual surfaces to be used in a "texture library" of realistic replicatable fill patterns. In the preferred embodiment, the invention provides a method for identifying and isolating discontinuities in a texture pattern. The invention facilitates the smoothing of the isolated border discontinuities to produce a transformed, borderless texture sample.

22 Claims, 11 Drawing Sheets

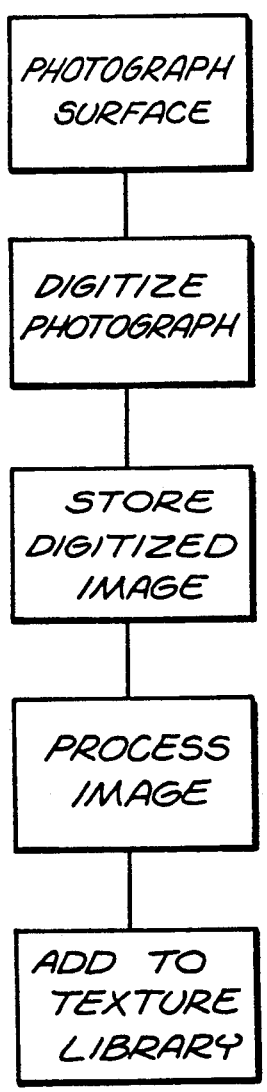
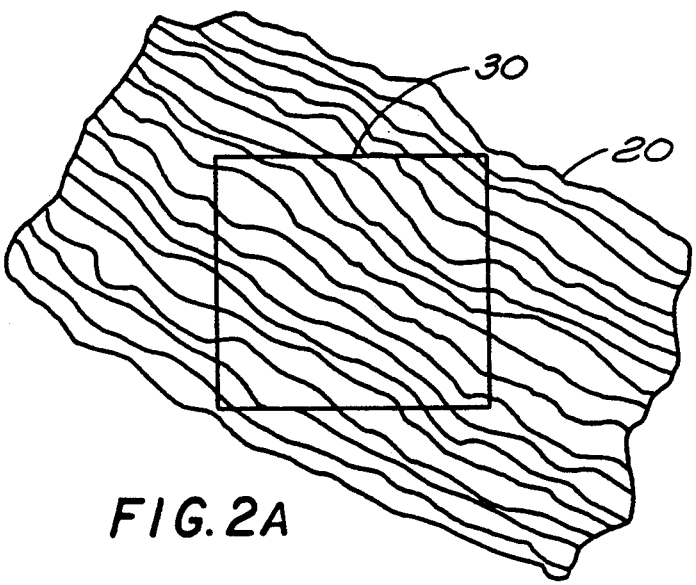
FIG. 2A
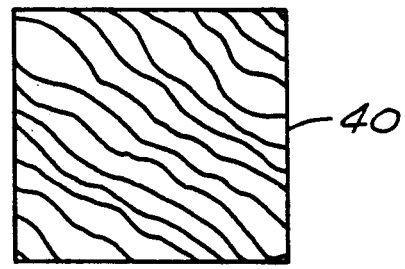
FIG. 2B
FIG. 1
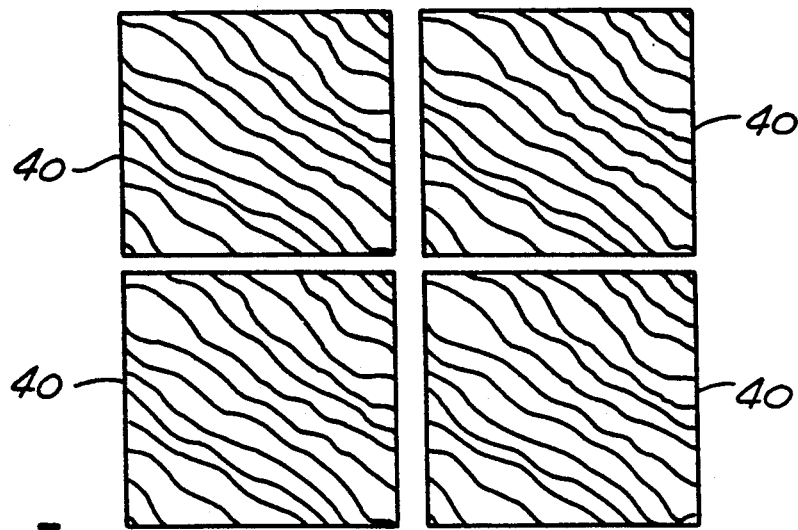
FIG. 3

METHOD FOR BORDERLESS MAPPING OF TEXTURE IMAGES

BACKGROUND OF THE PRESENT INVENTION

1. Field of the Invention

The present invention relates to the fields of computer graphics and image processing, and more particularly to a method for processing a photographic texture sample image to allow borderless mapping of the texture onto any size surface.

2. Background of the Invention

Many prior art computer "paint" programs and 3-D design programs exist that allow the creation of computer graphics images. In these programs an input device, typically a "mouse", is used to draw lines, dots, patterns, and geometrical shapes on a computer screen. Depending on the sophistication of the specific paint program being used, the elements drawn on the computer screen can be created in black and white or in color and can be combined to create almost any kind of drawing or picture. More sophisticated programs allow the creation of three-dimensional objects that can be rotated and viewed from any angle on the screen. Pictures of landscapes, animals, people, and other inanimate or animate objects can be produced. Many programs offer the ability to automatically "fill", or paint, any object shown on the screen. In addition to offering different fill colors, different fill patterns may also be offered. Common fill patterns represent brick walls or latticed surfaces. The fill patterns may be simple two-dimensional designs or may feature a simulated depth component that creates shadows that give a three-dimensional effect. Fill patterns are generally stored in the form of geometrically symmetrical unit "tiles" of the patterns. To fill surfaces larger than the size of a unit tile, several identical tiles are pasted adjacent to one another to form a larger multi-tile pattern. This multi-tile pattern can then be pasted on a two-dimensional object or wrapped around a three-dimensional object to give the object the desired appearance. In order for this multi-tiled pattern to create a uniform, photorealistic effect, however, the pattern on each tile must blend seamlessly (i.e., without borders) with the pattern on each adjacent tile. Because of this requirement, only artificially computer generated symmetrical patterns such as reproductions of lattices and brick walls have been available as borderless fill patterns in prior art paint programs.

The textures of surfaces of real life objects do not have the regular geometric patterns required by prior art paint programs to allow borderless mapping of a texture pattern. Typical examples are wood, stone, cement and even water surfaces. Because these real life surface textures do not have surfaces that can be easily divided into regular, replicatable units, it has not heretofore been possible to use images of actual real life textured surfaces as borderless fill patterns in computer graphics paint programs.

Computer "paint" programs and computer aided design programs are often used by architects, engineers and others to render computer generated images of new structures or changes to existing structures. In one commercial application of these computer imaging systems, a paint manufacturer uses a computer to generate an image of a customer's house from a photograph to show the customer how the house would look with different colors of paint. In this application, an outline of the house is generated on a computer display screen by scanning an appropriate photograph. The computer operator designates the enclosed surfaces that are to be painted, and the color desired. The computer then "fills" the indicated enclosed surfaces with a red-/green/blue ("RGB") pixel pattern that results, visually, in the desired color. The fill colors are usually instantly changeable such that a large number of different colors can be considered. Although these programs can relatively accurately reproduce paint colors, they, like the less specialized paint programs described above, cannot produce realistic looking textures. As a result, without the ability to generate realistic texture fill patterns, the degree of photorealism that can be achieved with prior art architectural design and rendering programs has been limited.

SUMMARY OF THE PRESENT INVENTION

The present invention consists of a method by which any random sample of an image pattern can be modified so as to produce a replicatable unit for graphics applications that can be uniformly integrated together to cover a desired surface area. An application of the present invention is the creation of a library of digitized samples of real surfaces that can be used to create photorealistic computer graphic images. The creation of such a library can be accomplished as generally shown in FIG. 1. A photograph of an object's surface is taken, digitized, and stored in a computer's memory. The stored image is processed such that a continuous, borderless and replicatable surface sample is produced. The image is stored together with similarly processed images of other surfaces in a surface sample library. The images stored in the surface sample library can be accessed by computer drawing or paint programs to apply photorealistic surfaces to computer generated images.

In the preferred embodiment, the invention provides a method for identifying and isolating border discontinuities in a surface texture pattern. The invention facilitates the smoothing of the isolated border discontinuities to produce a transformed borderless texture sample that can interface with other copies of the transformed sample. Using the present invention, a realistic borderless texture pattern can be mapped onto any desired surface area.

BRIEF DESCRIPTION OF THE DRAWINGS

FIG. 1 is a schematic block diagram of the steps used in the image processing method of the present invention.

FIG. 2A is a plan view of a sample of material exhibiting a nonregular surface texture pattern.

FIG. 2B shows a rectangular texture pattern sample taken from the sample of material shown in FIG. 2A.

FIG. 3 shows four adjacent identical copies of the rectangular texture sample shown in FIG. 2B.

DETAILED DESCRIPTION OF THE PRESENT INVENTION

The present invention consists of a method for transforming any random texture sample into a uniformly mappable unit. In the following description, numerous details, such as scanner resolution, display size, etc., have been set forth in order to provide a more thorough description of the invention. It will be apparent, however, to one skilled in the art, that the invention can be practiced without these specific details. In other instances, well known features have not been described in detail so as not to unnecessairly obscure this invention.

The source of the images used in the present invention are preferably actual objects. FIG. 2A illustrates a typical object 20 having a non-symmetrical surface texture. Object 20 may be almost any object, such as wood, stone, masonry, glass, grass, roofing, water, etc. To obtain an image of the surface texture of the object 20 that can be entered into a computer, a high resolution photograph is taken of a section of the object's surface. This sample section is indicated as item 30 in FIG. 2A. Preferably a high quality, low granularity color film such as Kodak ® Ektachrome ® 50 is used to obtain an accurate representation of both the color and the texture of the surface of object 20. However, black and white film may also be used if a sample of the surface's texture is desired, but not of its color. Preferably, a series of photographs using different lighting arrangements (i.e. natural lighting, back lighting, strobe and front surface flash, or other well known lighting techniques) are taken. From the resulting photographs, those that most realistically depict the surface texture of the object 20 are selected. It has been found that photographs printed in a size that results in a ratio of between 5:1 and 8:1 between the size of the image and the actual size of the texture sample provide for desirable photo-realism when used for graphics image data, although other ratios may also provide satisfactory results.

Once the proper photograph has been selected, a high-resolution scanner is used to create a digitized image that can be stored in a computer. Preferably, a 1000 DPI 24 bit scanner is used. This type of scanner generates 1000 24 bit data signals per linear inch. Each signal contains 8 bits each of red, green, and blue intensity information. The resulting scanned texture sample image 40 is shown in FIG. 2B. Preferably, the scanned image is converted to a 512 by 512 pixel, one inch square unit texture sample image, although other sizes may also be used.

Figure 4:
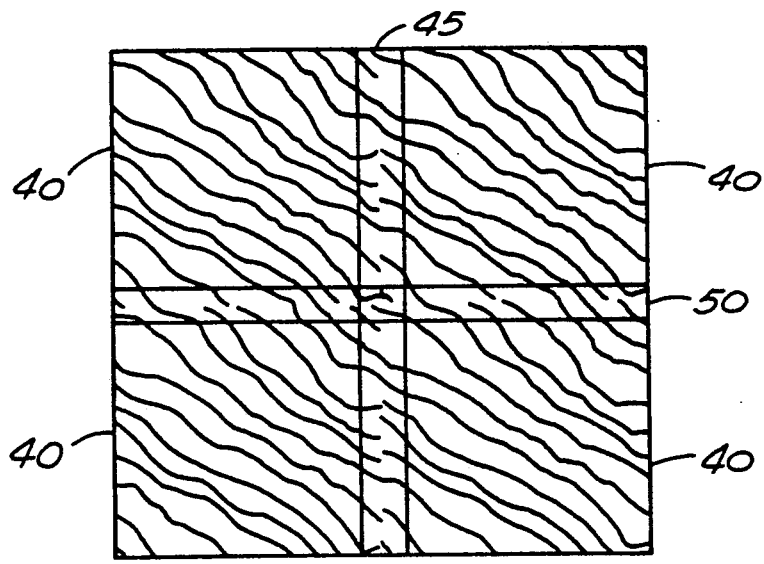
FIG. 4 shows the discontinuities formed across adjoining borders when the four texture pattern copies of FIG. 3 are placed immediately adjacent to one another.

A scanned texture sample image can be replicated and multiple copies of the scanned image can be "pasted" adjacent to each other to "map" the texture image over a larger surface. This mapping process is illustrated in FIGS. 3 and 4. FIG. 3 shows four identical copies of the original scanned texture sample 40. In FIG. 4, these four samples are placed directly adjacent to one another in a process that is analogous to laying tiles, with each copy of the scanned texture sample 40 representing a single tile. Because the texture represented by scanned texture sample 40 does not have a geometrically regular pattern, the texture features (represented by the irregular wavy lines of the original texture sample 40) do not join smoothly at the interfaces between two adjacent tiles. Instead, discontinuities in the texture pattern are created along the interfaces. In FIG. 4, these regions of discontinuity are indicated by reference numerals 45 and 50. If larger surfaces are mapped with the scanned texture sample 40, the resultant surface displays the "tiling" effect shown in FIG. 12. Instead of what is supposed to be a continuous surface texture, the resultant surface appears to be made up of a number of individual rectangular tiles. Because of this tiling effect, prior art methods have been unsatisfactory for mapping texture samples onto computer generated surfaces.

The present invention consists of a method for transforming a texture sample such as texture sample 40 into a uniformly mappable texture sample unit. The present invention allows the creation of a realistic "texture library" of texture fill patterns that can add photo-like realism to computer generated images.

Figure 5A:
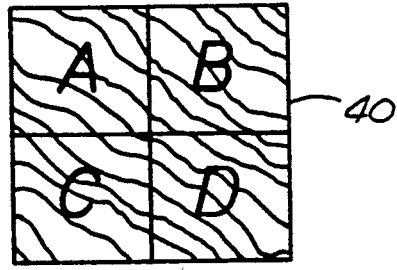
FIG. 5A shows the texture sample of FIG. 2B divided into four equally-sized quadrants A, B, C and D.
Figure 5B:
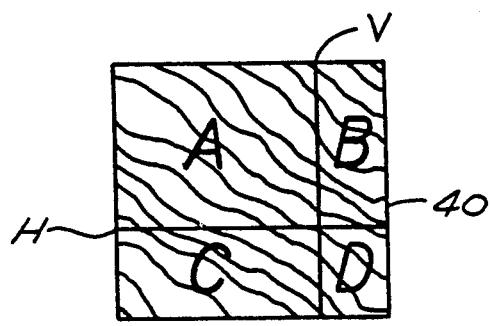
FIG. 5B shows the texture sample of FIG. 2B divided into four unequal quadrants A, B, C and D.
Figure 6:
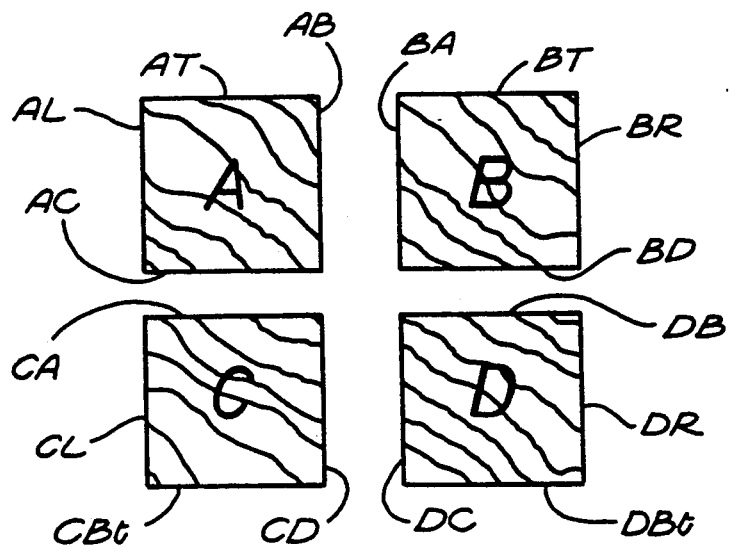
FIG. 6 shows the quadrants of FIG. 5 separated from one another.

The steps of the preferred embodiment of the method of the present invention are shown in FIGS. 5 through 10. Referring to FIG. 5A, the scanned rectangular texture sample 40 obtained by the prior art methods described above is divided into quadrants A, B, C and D. The quadrants are preferably equal in size. However, as shown in FIG. 5B, texture sample 40 may be divided into quadrants A, B, C and D by any combination of a vertical line V and a horizontal line H. In the preferred embodiment, texture sample 40 is 512 by 512 pixels in size and each quadrant A, B, C and D is 256 by 256 pixels. Next, quadrants A, B, C and D are separated from each other as shown in FIG. 6. After separation, each quadrant has two edges that were formerly parts of the external edges of original scanned texture sample 40 and two edges that were formerly simply invisible internal boundaries between quadrants.

In FIG. 6, the edges of quadrants A and B that represent the line along which quadrants A and B were separated from each other are designated as edge "AB" with respect to quadrant A and edge "BA" with respect to quadrant B. Similarly, the lines of separation between quadrants B and D, D and C, and C and A are designated edges "BD" and "DB", edges "DC" and "CD", and edges "CA" and "AC" respectively. Each of these pairs of edges that represent the former invisible boundary between two quadrants can be referred to as "complementary interior edges". For instance, edges AB and BA are complementary interior edges, as are edges BD and DB, DC and CD, and CA and AC, respectively. An important characteristic of complementary interior edges is that quadrants joined together along their complementary interior edges are borderless.

In addition to two complementary edges, each quadrant also has two other edges. These edges were originally part of the exterior edges of scanned texture sample 40. As was shown in FIG. 4, discontinuities arise when these non-complementary exterior edges of texture sample 40 are joined together. In FIG. 5A, the non-complementary exterior edges of quadrants A, B, C and D are designated "AL" (for "quadrant A, left edge"), "AT" (quadrant A, top edge), "BT" (quadrant B, top edge), "BR" (quadrant B, right edge), "DR" (quadrant D, right edge), "DBt" (quadrant D, bottom edge), "CBt" (quadrant C, bottom edge), and "CL" (quadrant C, left edge), respectively.

Figure 7:
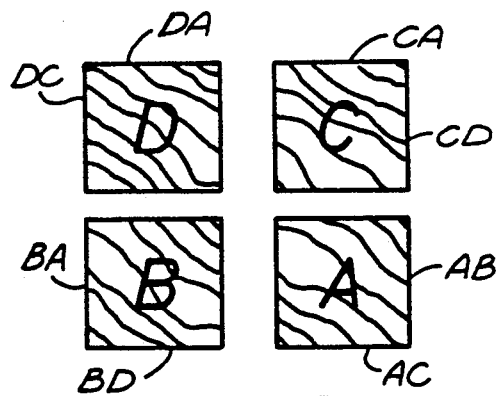
FIG. 7 shows the quadrants of FIG. 6 transposed according to one embodiment of the method of the present invention.

To summarize, quadrants A, B, C and D can be joined together along their complementary interior edges without borders, but discontinuities arise if they are joined together along their non-complementary exterior edges. In order to form a texture sample unit that can be joined together without borders, the exterior boundaries of the texture sample unit must consist only of complementary interior edges. The present invention allows original texture sample 40 to be transformed into a transformed texture sample that exhibits only complementary interior edges as shown in FIGS. 7 through 9.

Referring again to FIG. 6, it can be seen that quadrant A has its complementary edges AC and AB, respectively, on its bottom and right sides, while quadrant D has its complementary edges DA and DC on its top and left sides, respectively. If the position of quadrant A is exchanged with the position of quadrant D, as shown in FIG. 7, complementary edges AC and AB become part of the exterior boundaries of the transformed texture sample made up by this rearrangement of the original quadrants. Similarly, the complementary edges DB and DC of quadrant D, which now occupies the position formerly held by quadrant A, also form part of the transformed texture sample's exterior boundaries. If the positions of quadrants B and C are also exchanged, as shown in FIGS. 7 and 8A, the entire exterior boundaries of the transformed texture sample consist of the complementary edges of the four quadrants.

The internal boundaries between quadrants, on the other hand, now consist of the original non-complementary exterior edges. As shown in FIG. 8A, the above-described rearrangement of the quadrants of the original texture sample 40 results in a transformed texture sample 40' in which the external discontinuities that originally occurred on the exterior edges of original texture sample 40 have been transformed into internal discontinuities at the boundaries between the quadrants, while the originally discontinuous external boundaries have been replaced by continuous, originally internal boundaries. The benefits of this transformation are twofold: first, a transformed texture sample unit is formed that can be joined together at its edges without borders; and second, the boundary discontinuities have been confined to finite regions in the interior of the texture sample where they can be easily modified and eliminated using local image processing techniques.

Figure 8A:
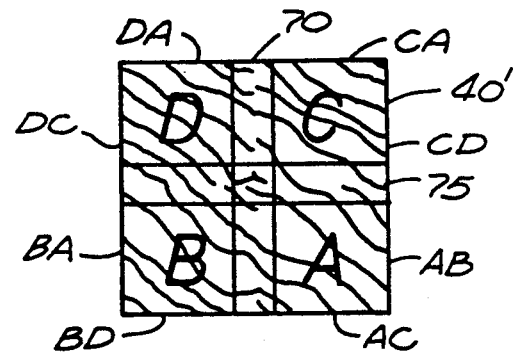
FIG. 8A shows the transposed quadrants of FIG. 7 placed adjacent to each other and the resultant internalized discontinuities.
Figure 9:
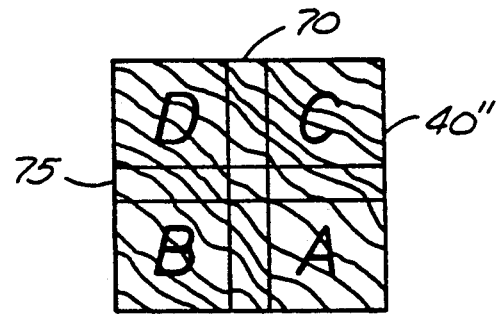
FIG. 9 shows the transformed texture sample of the present invention formed by smoothing the discontinuities shown in FIG. 8.

As shown in FIG. 8A, the regions of discontinuity in transformed texture sample 40' occur along a vertical strip 70 and a horizontal strip 75. To eliminate these discontinuities, computer graphics image processing techniques are used. Computer paint programs usually offer a variety of tools that allow a computer image to be modified on a variety of levels. Individual picture elements and even individual pixels can be moved, changed, modified, copied and replaced. Depending on the sophistication of a specific paint program, these techniques may be automatic (as for example in the highly sophisticated image enhancement programs used by NASA to process satellite photographs) or they may be manual.

Figure 8B:
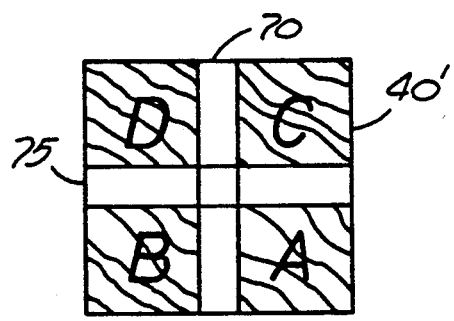
FIG. 8B shows the transformed texture sample of FIG. 8 with the regions of discontinuity removed.
Figure 10A:
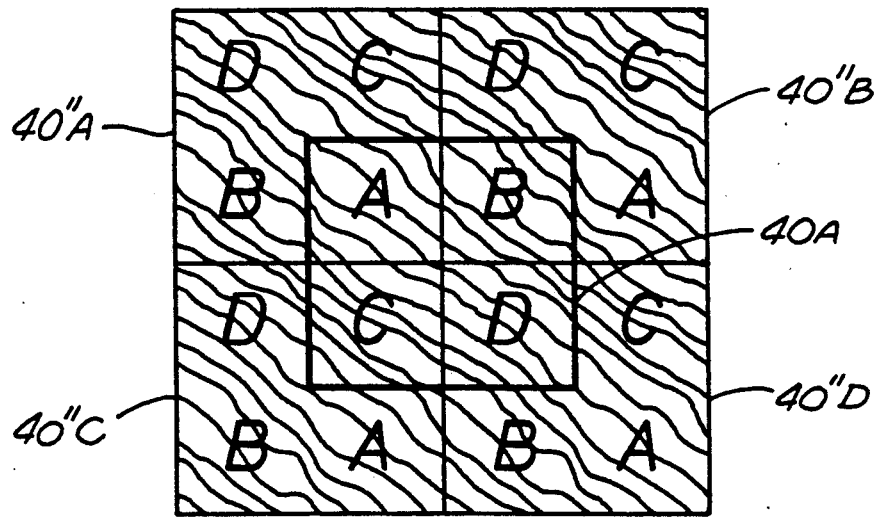
FIG. 10A shows four adjacent transformed texture samples identical to the transformed texture sample of FIG. 9.
Figure 10B:
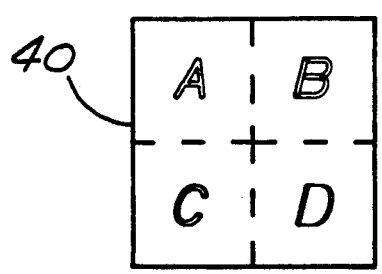
FIG. 10B is a simplified representation of the texture sample of FIG. 2B.
Figure 10C:
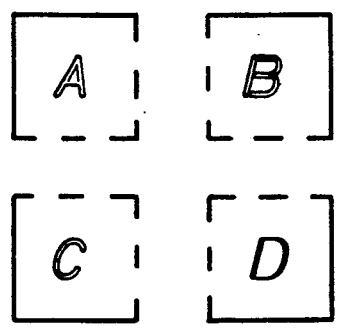
FIG. 10C shows the texture sample of FIG. 10B divided into four equally-sized quadrants A, B, C and D.

One method that can be used to eliminate the internal discontinuities of transformed picture sample 40' with the tools supplied by a typical computer paint program is shown in FIGS. 8B and 9. First, an "eraser" tool is used to erase the regions of discontinuity contained in strips 70 and 75. The resulting texture sample 40" is shown in FIG. 8B. Next, the various line drawing and pixel editing tools and copying and cloning tools of the paint program are used to fill the now empty strips 70 and 75 with picture elements that smoothly join together the features found in each of the four quadrants adjacent to strips 70 and 75. With respect to original texture sample 40, which basically consisted of a pattern of wavy lines, the features used to fill strips 70 and 75 are simply wavy line segments that are used to link together the hanging ends of the wavy line segments of each pair of adjacent quadrants. For more complicated texture samples, especially those exhibiting color tones as well as textures, the strips 70 and 75 are filled with more complex features, but the basic concept is the same. For complex patterns, sections of the pattern may be copied and pasted onto the region of discontinuity. A smoothing operator, such as an airbrush, is then used to blend the pasted region with existing features to eliminate the discontinuity. The resulting transformed texture sample 40" is shown in FIG. 9. As shown in FIGS. 10 and 11, multiple copies of transformed texture sample 40" can be joined together to cover any size surface area.

As explained above, the reason that copies of texture sample 40" can be joined together without borders is because all of its external boundaries are complementary boundaries, i.e. boundaries that were originally invisible imaginary boundaries between different parts of the continuous interior region of original texture sample 40. When copies of transformed texture sample 40" are joined together, their union reconstructs the original interior of original texture sample 40. This concept is illustrated in FIG. 10. Four copies of transformed texture sample 40", designated 40"A, 40"B, 40"C and 40"D, respectively are joined together along their edges, resulting in a borderless texture pattern four times the size of transformed texture sample 40". As indicated by the heavy line 40A in FIG. 10, the resulting arrangement of quadrants A, B, C and D of adjacent copies of transformed texture sample 40" recreates the original arrangement of quadrants A, B, C and D. This can be seen by comparing FIG. 10 to FIG. 5, which illustrates the arrangement of quadrants A, B, C and D in original texture sample 40. Since the boundaries between quadrants in the original texture sample 40 were borderless invisible interior boundaries, and since these same boundaries form the boundaries between copies of transformed texture sample 40", the boundaries between copies of transformed texture sample 40" are borderless and invisible as well.

Figure 11:
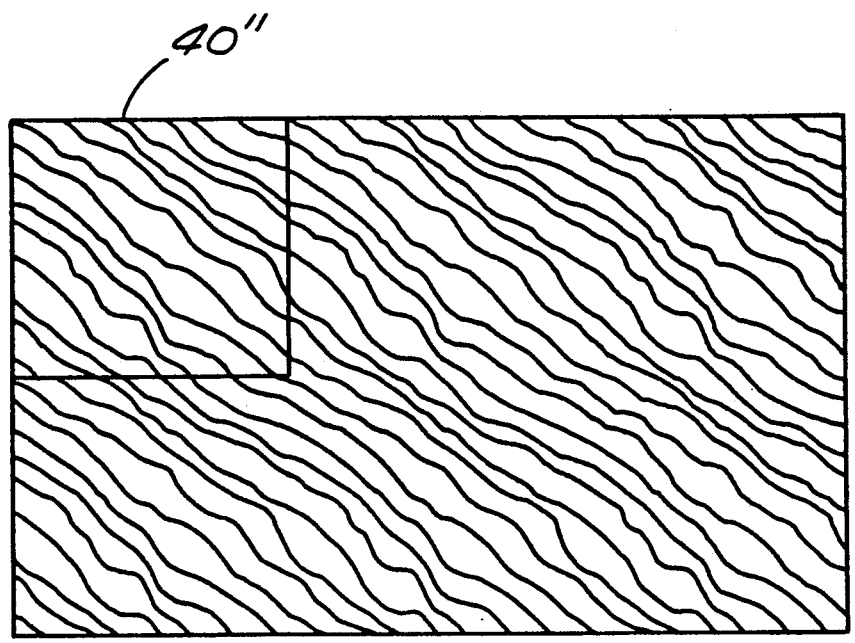
FIG. 11 shows the borderless texture pattern formed by six a adjacent copies of the transformed texture sample of FIG. 9.
Figure 12:
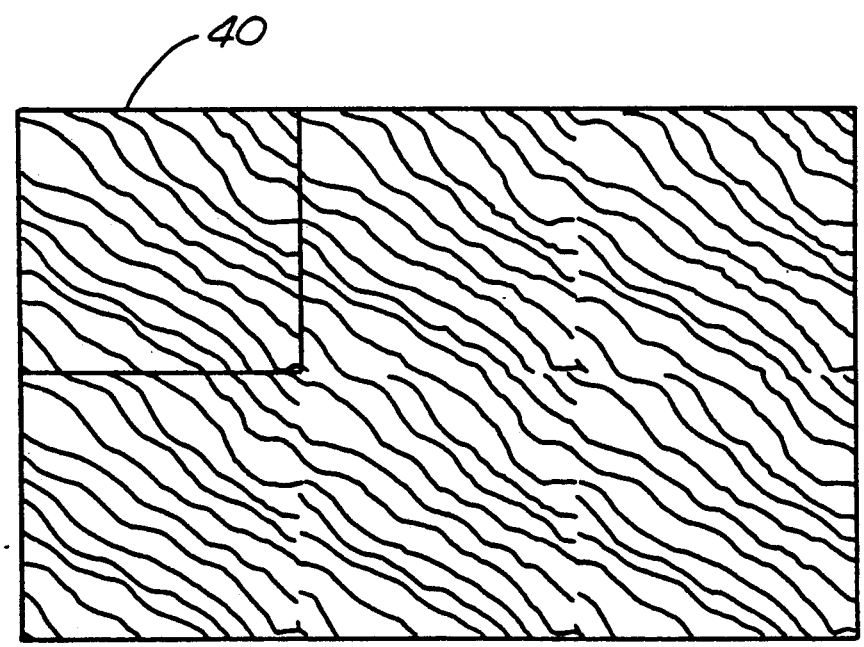
FIG. 12 shows the discontinuous, tiled texture pattern formed by six adjacent copies of the original texture sample of FIG. 2.

The difference between using the transformed texture sample 40" of the present invention for filling a large surface and using the untransformed texture sample 40 of the prior art is demonstrated in FIGS. 11 and 12. In each Figure, a surface representing a three by two array of texture samples is depicted. In FIG. 11, a smooth, continuous pattern is created by using transformed texture sample 40", with no apparent boundaries between the individual copies of the transformed texture sample. If FIG. 11 is compared with FIG. 2A, it can be seen that the texture pattern of FIG. 11 realistically recreates the texture pattern of the original object 20 in FIG. 2A from which the original texture sample 40 was taken. In FIG. 12, however, the discontinuities between adjoining copies of original texture sample 40 are clearly evident, resulting in a jagged, unrealistic, "tiled" texture pattern.

Original texture pattern 40, and accordingly transformed texture pattern 40", is preferably created in a 1:1 size ratio to the object from which the sample is taken. Preferably, a 1½" by 1" or a 2" to 2" sample unit is used, although other formats may alternatively be used with satisfactory results. In the preferred method of utilizing the transformed texture sample 40", transformed texture sample 40" is scaled to the scale of the surface to which it is being applied. For example, if it is desired to apply a 2" by 2" texture sample to a computer generated image of a wall whose actual dimensions are 48 inches by 96 inches but that is shown on the computer screen as a 1/12 scale image, the surface of the wall would be filled by an array of 24 by 48 or 1152 transformed 2" by 2" texture sample units reduced in size by a factor of 1/12. The resulting texture exhibited by the computer image of the wall is "photorealistic" in both size and appearance.

Referring again to FIG. 10, it will be noted that the two by two array of transformed texture samples 40" shown in FIG. 10 itself also constitutes a borderlessly mappable texture sample unit, albeit one that is four times the size of original texture sample 40. Rather than being constructed by combining four already-transformed texture samples 40", this 1024 by 1024 pixel texture sample can also be constructed directly from original texture sample 40. This alternate embodiment of the present invention is described below As shown in FIG. 10B, the starting point for this embodiment is once again original texture sample 40, which, for purposes of simplification, is shown without its surface texture lines. As in the previous embodiment, original texture sample 40 is divided into quadrants A, B, C and D as shown in FIGS. 10B and 10C. In FIG. 10C, solid lines represent edges of the quadrants that constitute part of the exterior boundary of original texture sample 40. Broken lines represent edges that correspond to invisible interior boundaries between quadrants of the original texture sample.

Figure 10D:
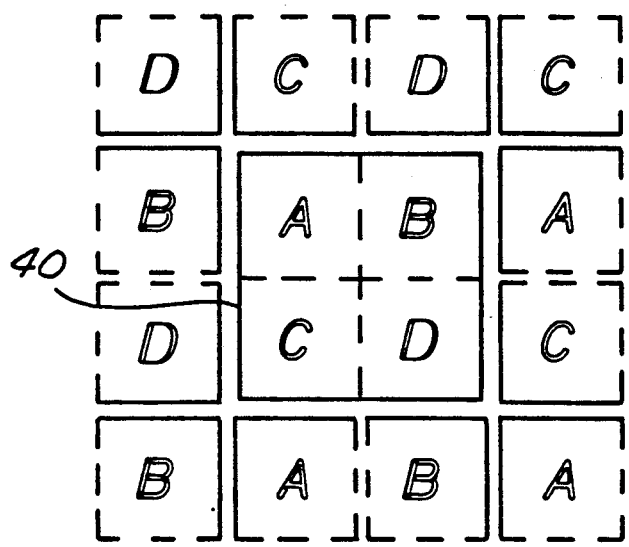
FIG. 10D shows the texture sample of FIG. 10B surrounded by copies of quadrants A, B, C and D of FIG. 10C.

To construct the transformation of the present embodiment, copies of quadrants A, B, C and D are arranged around the original texture sample 40 as shown in FIG.10D. These quadrants are arranged such that each quadrant that is placed next to an exterior boundary of any of the four original quadrants of the texture sample 40 is a copy of the quadrant that borders that original quadrant on its opposite interior boundary. For example, the quadrant that is placed next to the left exterior boundary of quadrant A of original texture sample 40 in FIG. 10D is a copy of the quadrant that borders quadrant A on its opposite (right) interior boundary, namely quadrant B. Likewise, a second copy of quadrant B is placed below original quadrant D, copies of quadrant A are placed below original quadrant C and to the right of original quadrant B, copies of quadrant C are placed above original quadrant A and to the right of original quadrant D, and copies of quadrant D are placed above original quadrant B and to the left of original quadrant C. Diagonally, a copy of quadrant A is placed to the lower right of original quadrant D (corresponding to original quadrant A found on the diagonally opposite interior side of original quadrant D in original texture sample 40), a copy of quadrant B is placed to the lower left of original quadrant C, a copy of quadrant C is placed to the upper right of original quadrant B, and a copy of quadrant D is placed to the upper left of quadrant A.

Figure 10E:
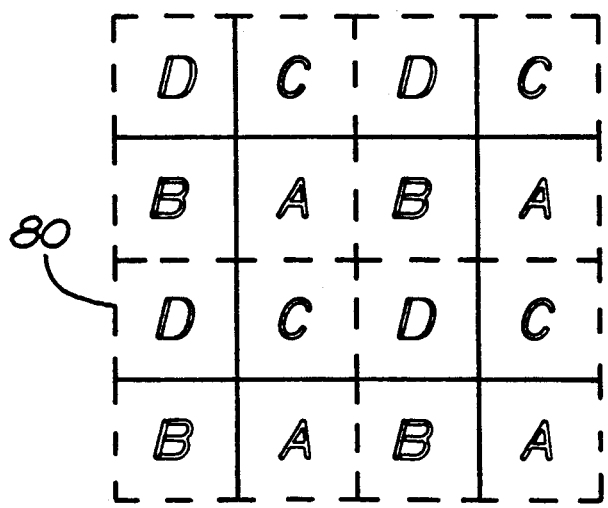
FIG. 10E shows a transformed texture sample formed by the joining the elements shown in FIG. 10D.

The resulting combined large texture sample 80 is shown in FIG. 10E. As in the previous embodiment, all of the exterior edges of large texture sample 80 are complementary interior edges of original texture sample 40 (indicated by broken lines) while the discontinuous exterior boundaries of original textrue sample 40 (indicated by solid lines) have been confined to the interior of large texture sample 80. These discontinuities are eliminated using the same methods used in the previous embodiment, resulting in a large, transformed, borderlessly mappable texture sample identical to the two by two array of transformed textrue samples 40'' shown in FIG. 10A.

The embodiments of the present invention described above involve transformations of rectangular texture samples. The transformation method of the present invention can also be used with other sample shapes. The only restriction is that the shape must be able to form a tessellation, that is, it must be a shape copies of which, having the same size and orientation, can be joined together to cover any desired surface area.

Figure 13:
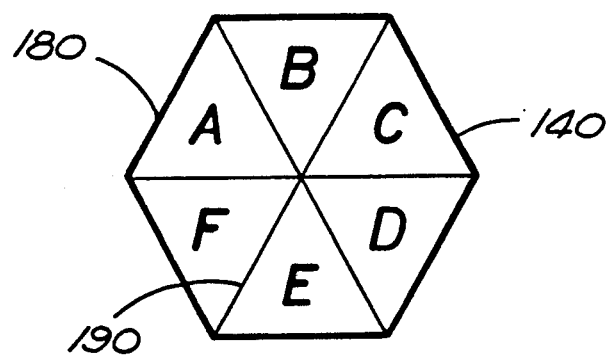
FIG. 13 shows a hexagonal texture pattern sample.

One example of a shape other than a rectangle that can be tesselated is a regular hexagon. FIG. 13 shows a hexagonal texture sample 140. For the sake of clarity, the shape but not the actual surface texture is shown in FIG. 13. It will be assumed, however, that hexagonal texture sample 140 exhibits a random texture pattern similar to the texture pattern shown in FIG. 2B for rectangular texture sample 40. As depicted in FIG. 13, hexagonal texture sample 140 has been arbitrarily divided into six triangular regions A, B, C, D, E and F. Heavy lines 180 represent the "non-complementary exterior edges" of hexagonal texture sample 140. Thin lines 190 represent the "complementary interior edges" of adjacent triangular regions A through F.

Figure 14:
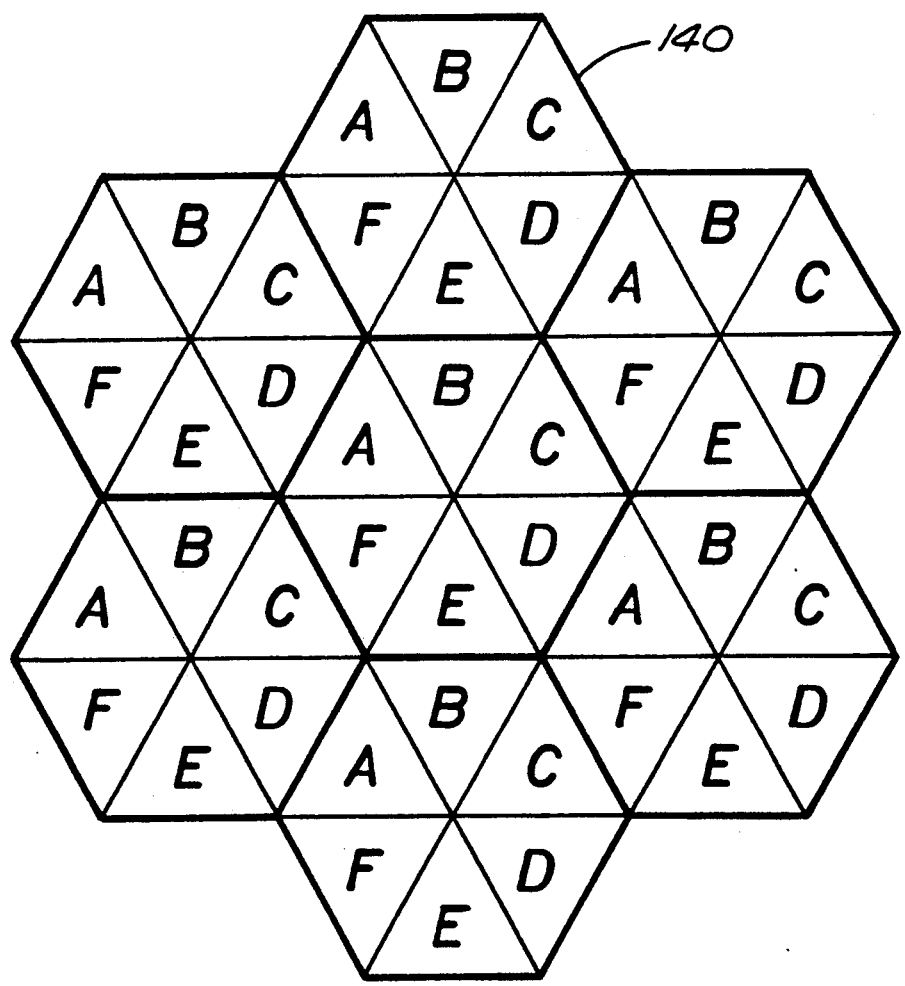
FIG. 14 shows a tessellation of the hexagonal texture pattern of FIG. 13.

FIG. 14 shows how multiple copies of texture sample 140 can be tessellated in a honeycomb pattern. As with the rectangular texture sample 40 shown in FIGS. 3 and 4, because the exterior boundaries of hexagonal texture sample 140 consist of non-complementary exterior edges, discontinuities in the texture pattern will arise at the interfaces between adjacent copies of hexagonal texture sample 140. These discontinuities occur along the heavy lines 180.

The same basic method used to transform rectangular texture sample 40 into borderlessly mappable rectangular transformed texture sample 40'' is used to transform the original hexagonal texture sample 140 into a borderless mappable transformed hexagonal texture sample. The original texture pattern is divided into sections and the original sections are rearranged into a transformed texture sample in which all of the discontinuities have been internalized such that all external boundaries consist only of complementary edges. The transformed texture sample must meet the following criteria:
1) The transformed texture sample must have the same size and shape as the original texture sample.
2) The transformed texture sample must contain every surface element contained in the original texture sample.
3) Every surface element of the transformed texture sample must maintain the same orientation as it had in the original texture sample.

Figure 15A:
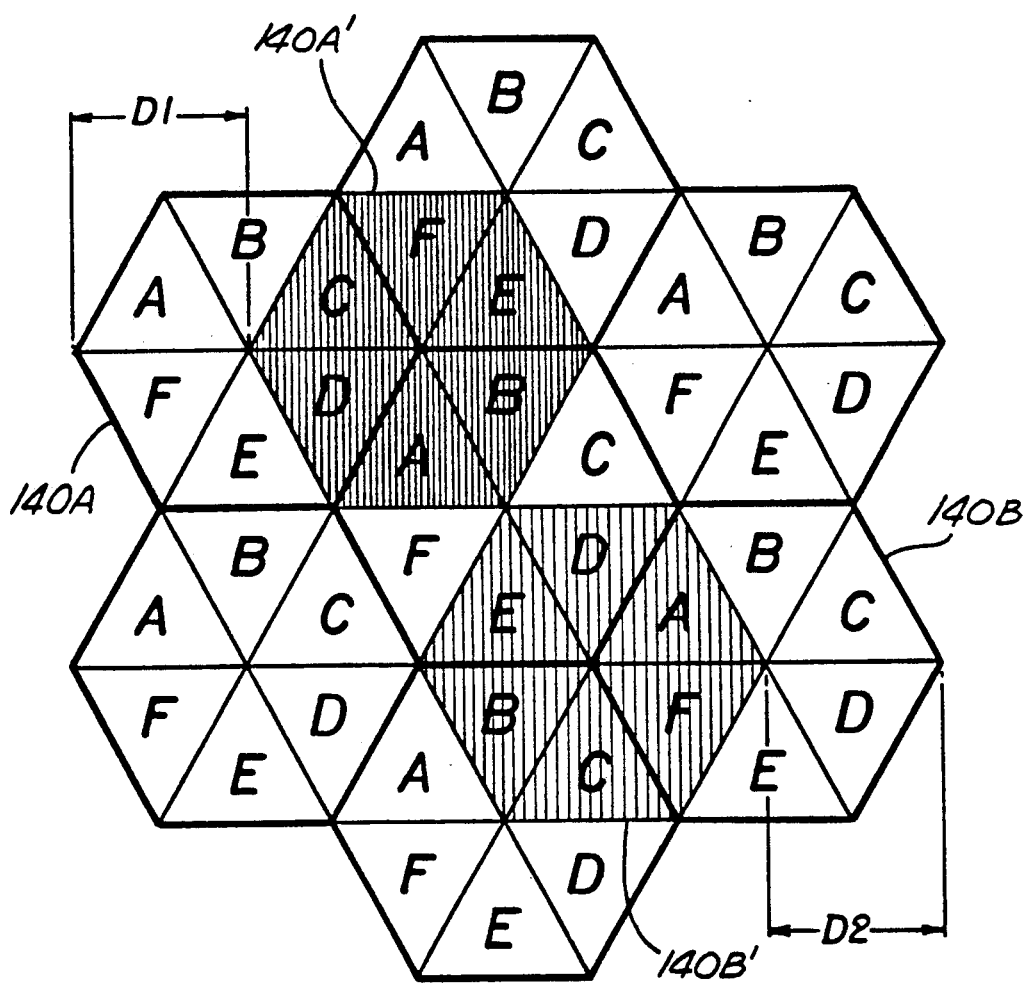
FIG. 15A shows transformed texture samples of the present invention formed by a finite translation of the outline of the hexagonal texture pattern of FIG. 13 over the tessellation of FIG. 14.
Figure 15B:
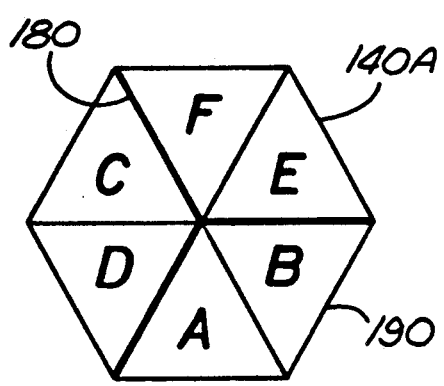
FIG. 15B shows one embodiment of the transformed texture samples of the present invention formed by the translation shown in FIG. 15.
Figure 15C:
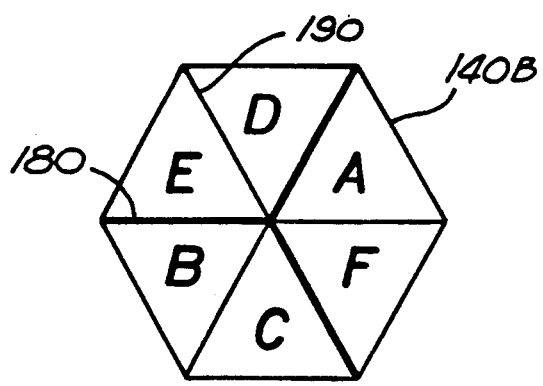
FIG. 15C shows a second embodiment of the transformed texture sample of the present invention formed by the translation shown in FIG. 15.

FIG. 15A shows two rearrangements of regions A thru F of original texture sample 140 that meet the above requirements. The resulting transformed texture samples are designated items 140'A and 140'B. As can be seen in FIGS. 15B and 15C, each transformed texture sample 140'A and 140'B exhibits only complementary edges 190 for boundaries (indicated by thin lines), has internalized the non-complementary edges 180 of original texture sample 140, and is made up of all six sections A thru F. The transformed texture samples 140'A and 140'B can be smoothed along lines 180 according to the method shown in FIGS. 8 thru 9 to produce borderlessly mappable, continuous hexagonal texture sample units.

As was shown in FIG. 10 and is again evident in FIG. 15A, one way of visualizing the transformation of the present invention is to consider it as the translation of the outline of the original texture sample across a tessellation of the original texture sample to a new position at which the discontinuous boundaries between the original copies of the texture sample fall into the interior of the new translated position of the outline. For instance, transformed texture sample 140'A in FIG. 15A can be thought of as having been formed by moving the outline of original texture sample 140A to the right a distance D1, equal to the length of the base of triangular section A. Similarly, transformed texture sample 140'B can be considered to have been formed by translating the outline of original texture sample 140B to the left by a distance D2, equal to the length of the base of triangular section C. Since the triangular segments A through E are equilateral triangles, D1 and D2 are both equal in length to the length L of any side of a triangular segment.

Translating the outline of original texture sample 140 to the left or right by this exact length L results in a new position of the outline of original texture sample 140 in which the edges of the outline are superimposed exactly over the underlying edges of triangular segments A through F. The resulting transformed texture samples therefore consist of rearrangements of the triangular sections A through F into which original hexagonal texture sample 140 was divided. If the outline had been translated by an amount other than distance L, the original texture sample 140 would have to be divided up differently to produce the transformed texture sample defined by the new location of the outline.

Figure 16A:
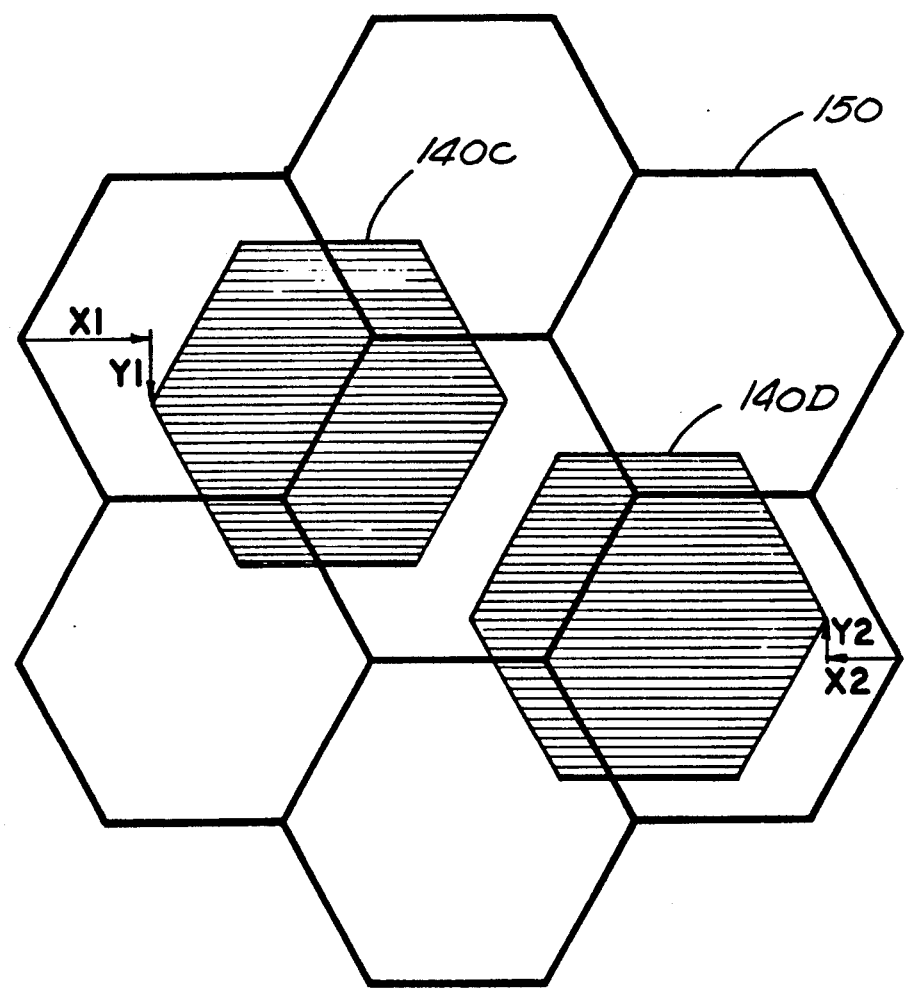
FIG. 16A shows horizontal and vertical translations of the structure of FIG. 15A.
Figure 16B:
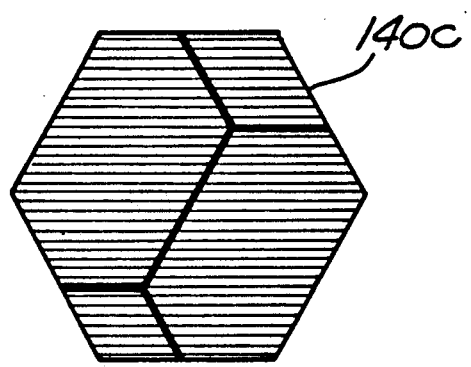
FIG. 16B is a detailed view of one translation of FIG. 16A.
Figure 16C:
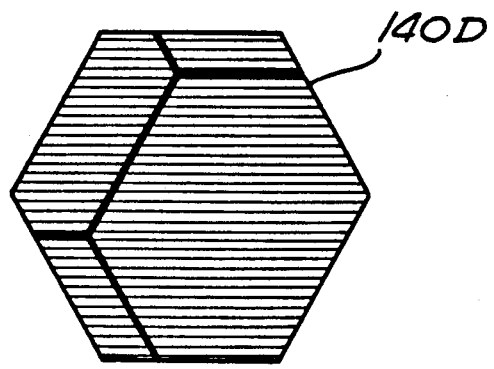
FIG. 16C is a detailed view of another translation of FIG. 16A.

FIGS. 16A, 16B and 16C show examples of two horizontal and vertical translations of the outline of hexagonal texture sample 140 over the tessellation 150 by distances X1 and Y1, and distances X2 and Y2, respectively. It can be seen that in each case the thick lines representing the discontinuous exterior boundaries of the original hexagonal texture sample 140 have been transferred into the interior of the displaced outlines 140C and 140D. It can also be seen that for each finite translation, a different rearrangement of the internal surface elements of original texture sample 140, and hence a different embodiment of the transformation of the present invention results.

Figure 17A:
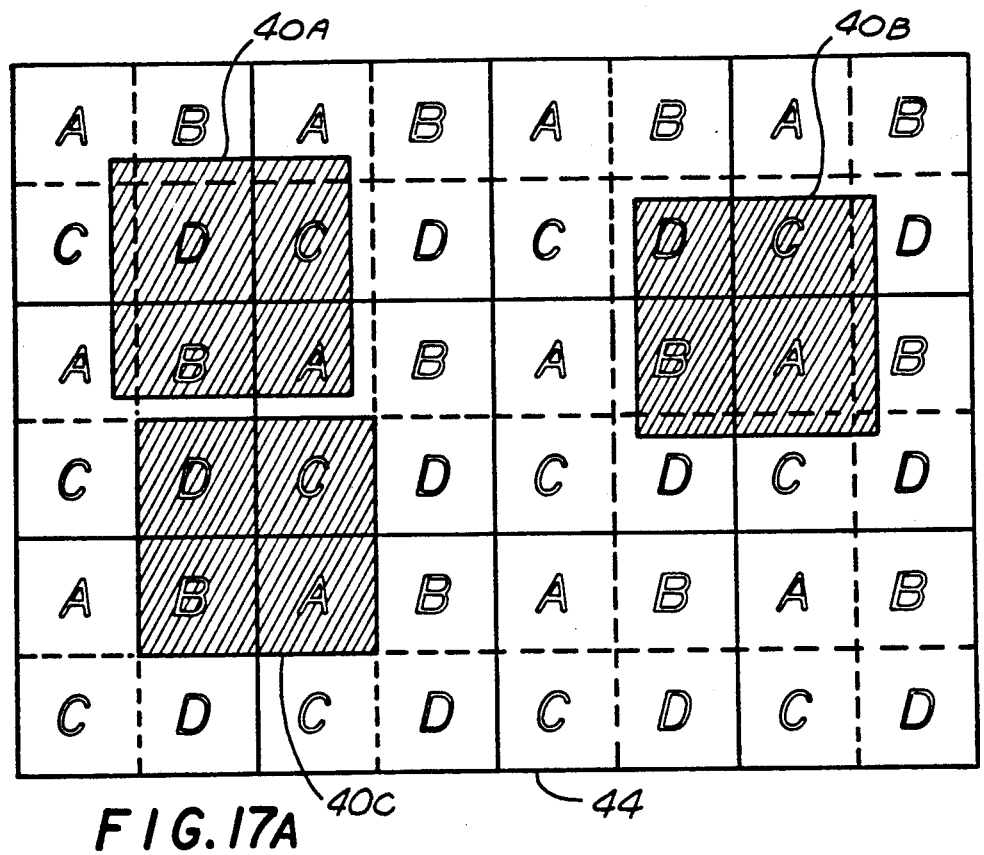
FIG. 17A shows a four-by-three array of the texture sample of FIG. 2B.
Figure 17B:
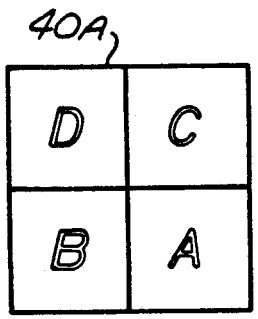
FIG. 17B is a detailed view of a first transformed texture sample obtained by translation of the outline of the texture sample over the array of FIG. 17A.
Figure 17C:
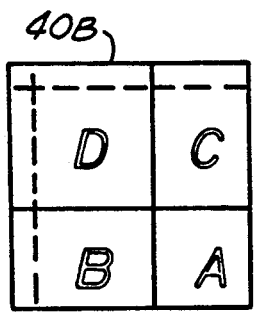
FIG. 17C is a detailed view of a second transformed texture sample obtained by translation of the outline of the texture sample over the array of FIG. 17A.
Figure 17D:
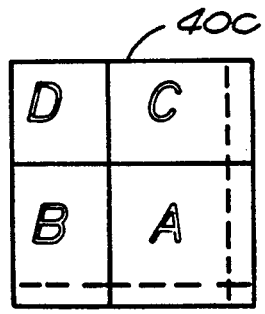
FIG. 17D is a detailed view of a third transformed texture sample obtained by translation of the outline of the texture sample over the array of FIG. 17A.

FIGS. 17A, 17B, 17C and 17D show how the same method used in FIGS. 16A, 16B and 16C can be used with rectangular texture sample 40 to produce different transformations. FIG. 17A shows a four-by-three array 44 of original texture samples 40, and three transformed texture samples 40A, 40B, and 40C formed by different finite displacements of the outline of original texture sample 40. Transformed sample texture 40A, shown in detail in FIG. 17B, is identical to transformed texture sample 40' shown in FIG. 8A. Transformed texture sample 40C, shown in detail in FIG. 17D, is similar to the transformation that would result by performing the operations illustrated in FIGS. 6 through 9 on original texture sample 40 separated into sections along lines H and V shown in FIG. 5B. Transformed texture sample 40B, shown in detail in FIG. 17C, is similar to the transformation that would result from original texture sample 40 shown in FIG. 5B if lines H and V were displaced towards the top and left edges, respectively, of original texture sample 40.

As suggested by FIGS. 16A and 17A, in its most general form, the transformation of the present invention can be visualized as being formed by the finite translation of the outline of an original texture sample over a surface formed by a tessellation of the original texture sample. This more general embodiment of the transformation of the present invention is illustrated in FIGS. 18 through 20.

Figure 18A:
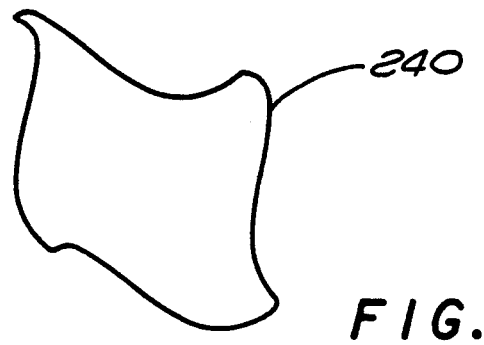
FIG. 18A shows a generic tessellatable texture sample.
Figure 18B:
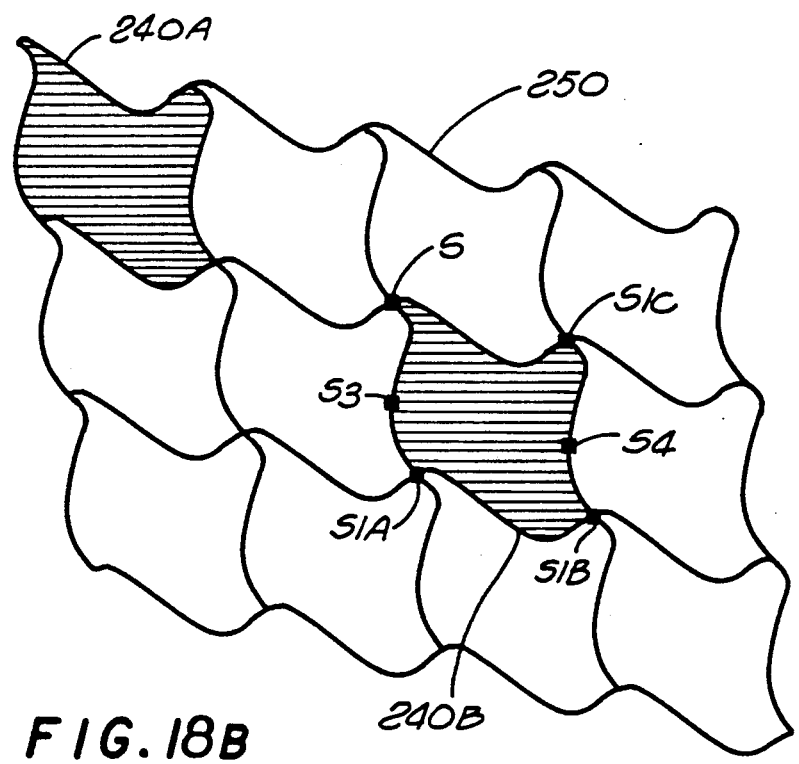
FIG. 18B shows a tessellation formed by the genetic texture sample of FIG. 18A.

FIG. 18A shows a generic, tesselatable texture sample 240. FIG. 18B shows a tessellation 250 formed by a 3 by 4 array of copies of texture sample 240. Two copies of the original texture sample have been highlighted and designated as items 240A and 240B.

Figure 19A:
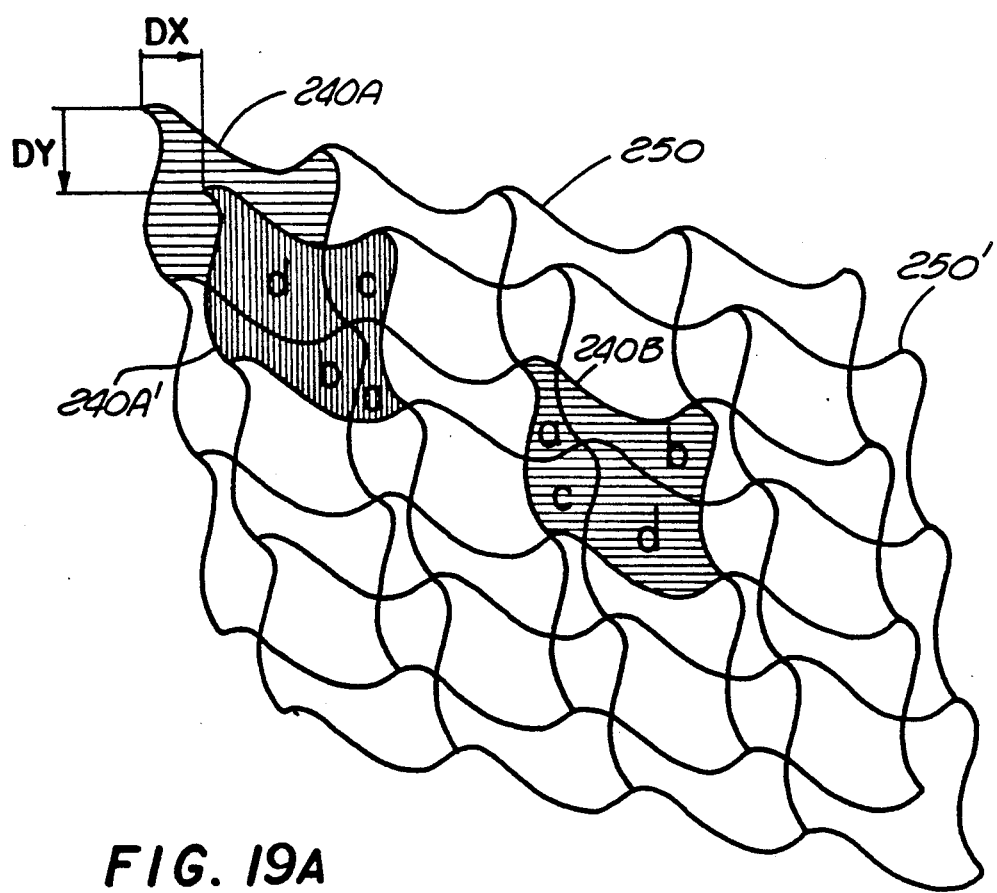
FIG. 19A shows a transformed texture sample of the present invention formed by a finite translation of the outline of the texture pattern of FIG. 18A over the tessellation of FIG. 18B.
Figure 19B:
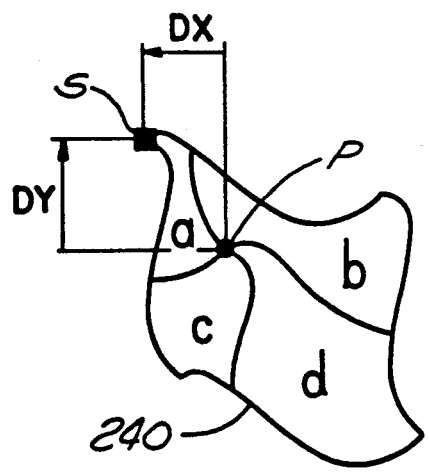
FIG. 19B shows the division of the texture sample of FIG. 18A into segments a, b, c and d resulting from the translation of FIG. 19.

In FIG. 19A, the outline of the tessellation 250 of FIG. 18B has been displaced down a distance DY and to the right a distance DX, and the resulting displaced outline 250′ has been superimposed on the original underlying tessellation 250. As can be seen in FIG. 19A, displaced outline 250′, as superimposed on the original outline 250 divides each texture sample copy 240 into four irregular segments. These segments have been labeled segments a, b, c and d with respect to highlighted original texture sample 240B. The resulting division of original texture sample 240 is shown in FIG. 19B. The outline of each displaced texture sample 240′, in turn, shows how segments a, b, c and d are recombined to produce the transformed texture sample of the present invention. The rearranged positions of segments a, b, c and d are shown in highlighted displaced texture sample 240A′. As in the previous embodiments of the transformation of the present invention, it can be seen that the exterior edges of original texture sample 240 shown in FIG. 19B have been moved into the interior of the transformed texture sample 240′ shown in FIG. 19C, while all the exterior edges of transformed texture sample 240′ consist of the invisible boundaries between sections a through d in the interior of original texture sample copy 240.

Figure 19C:
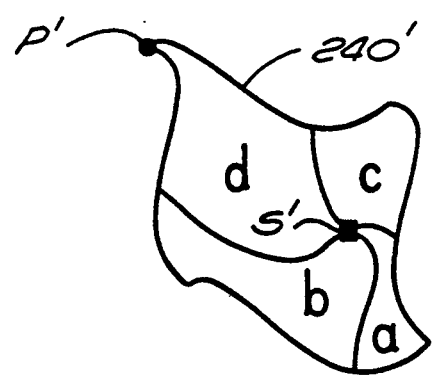
FIG. 19C shows the rearrangement of segments a, b, c and d of the original texture sample of FIG. 19A resulting from the translation of FIG. 19.
Figure 20:
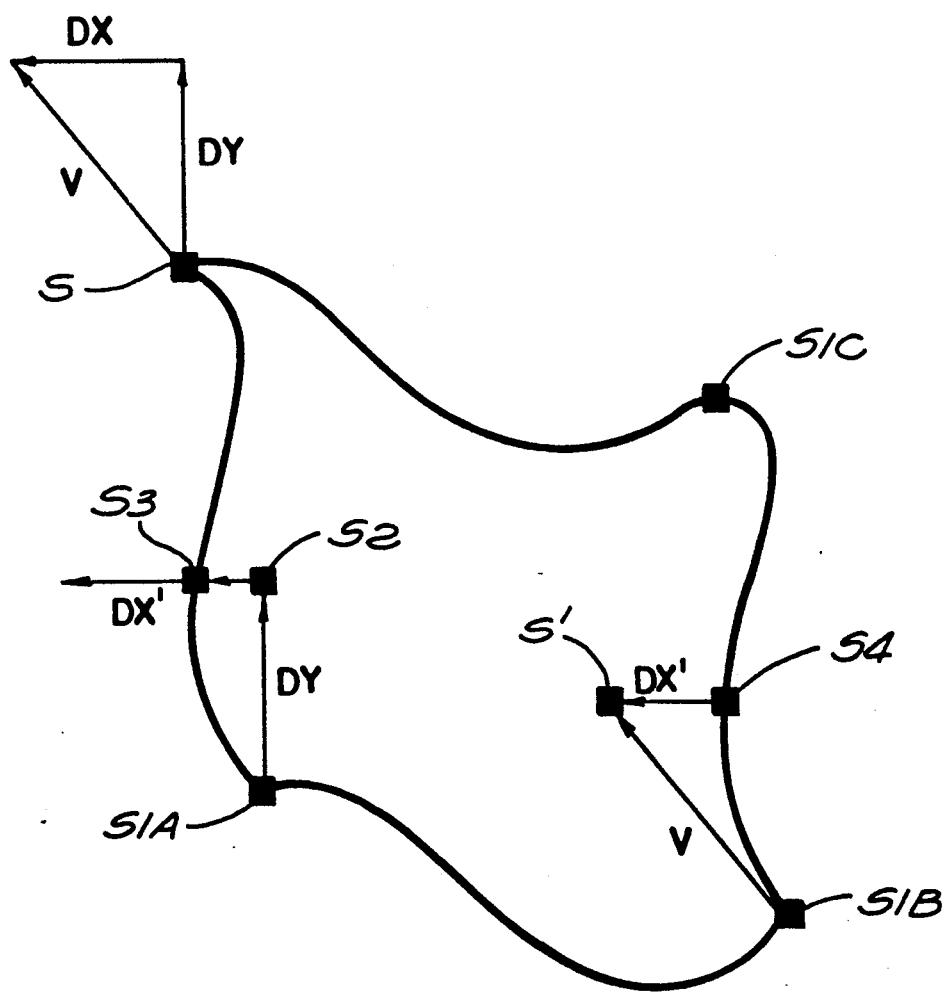
FIG. 20 shows how a point is rearranged according to the transformation of the present invention.

If original texture sample 240 in FIG. 19B is considered the "source" and the transformed texture sample 240′ in FIG. 19C the "target", it can be shown that the transformed texture sample 240′ is the result of displacing each point in original texture sample copy 240 up a distance DY and over a distance DX. This is evident by comparing the position of point P on original texture sample copy 240 of FIG. 19B with the position of the corresponding point P′ of transformed texture sample 240′ in FIG. 19C. Any surface element that would end up outside the original outline of original texture sample 240 by such a displacement is "wrapped around" the outline and reappears at the opposite side. This can be seen by comparing the original position of point S with the transformed position of point S′. This wrapping process is shown in greater detail in FIG. 20.

As shown in FIG. 20, point S is to be displaced up a distance DY and left a distance DX. Since point S is located on the upper edge of original texture sample 240, however, displacing point S these distances would put point S outside of the boundaries of original texture sample 240. By referring to FIG. 18B, it can be seen that point S of texture sample 240B is located at the junction of three other immediately adjacent copies of original texture sample copy 240. The points on the periphery of texture sample 240B that correspond to the points on the peripheries of these adjacent original texture sample copies that correspond to point S are designated points S1A, S1B and S1C. Each of these points S1A, S1B and S1C represent points to which point S can be "wrapped" as it moves across the periphery of original texture sample copy 240. Since point S is being moved vertically upwards, however, it must be wrapped to point S1A so as to continue its movement into the interior of original texture sample 240. Vertical movement from either point S1B or S1C places point S outside of the periphery of original texture sample 240. It is therefore from point S1A in FIG. 20 that the displacement of point S proceeds.

From point S1A, point S is displaced vertically upward a distance of DY to point S2. From here, the horizontal displacement of point S a distance DX to the left is begun. However, before moving the entire distance DX, point S again encounters the edge of original texture sample 240, this time at point S3. As can be seen in FIG. 20, a horizontal distance of DX′ remains to be moved. Point S must therefore once again be wrapped around the outline of original texture sample 240. As shown in FIG. 18B, the point that corresponds to point S3 after it is wrapped across the outline of original texture sample 240 is point S4 (Because point S3 is located at the juncture with only one adjacent copy of original texture sample 240, as opposed to point S which was located at the juncture with three other copies, there is only one corresponding mapping point). Turning back to FIG. 20, point S is displaced to the left from point S4 a distance of DX′, and ends up at point S′. This location is the same as the location of point S′ shown in FIG. 19C.

The same result is achieved if point S, rather than being moved first vertically and then horizontally, is moved along the displacement vector representing the combined displacements DX and DY. This vector is designated vector V in FIG. 20. In this case, point S is mapped to point S1B, rather point S1A, and point S is displaced along vector V from point S1B to once again end up at point S′.

Repeating either of the above processes for every pixel of original texture sample 240 creates transformed texture sample 240. It will be noted that each combination of different values for the displacements DX and DY will result in a different embodiment of the transformed texture sample of the present invention. In each embodiment, however, the exterior edges of the original texture sample will be internalized (where the resultant discontinuities can be easily eliminated), while the outside boundaries will have been transformed into smooth, continuous interfaces with adjoining copies of the transformation.

It will also be noted that the transformations illustrated in FIG. 8, 10E, 15A and 16A are specific applications of the general form of the transformation of the present invention described above. For example, the preferred embodiment of the present invention shown in FIG. 8 can be obtained by displacing each pixel in an original rectangular 512 by 512 pixel sample a distance DX of 256 pixels to the left and a distance DY of 256 pixels down according to the general method described above. The transformation of FIG. 10E can be obtained in the same way, except in this case the sample being transformed consists of a two-by-two array of the original 512 by 512 pixel sample rather than the original 512 by 512 pixel sample itself.

Although the present invention has been described with respect to certain specific embodiments, it will be apparent to those skilled in the art that the inventive features of the present invention can be used in a large number of others, all of which are intended to fall within the scope of the present invention.

I claim:

1. A method of transforming a first tessellatable surface having a finite number of original interior surface elements and having a border comprised of original peripheral surface elements such that a borderless tesselation of said first tessellatable surface can be accomplished, said method comprising the steps of:

performing a transformation of an original position of each surface element of said first tessellatable surface to a new position, said new position displaced from said original position along a displacement vector having a predetermined length, a predetermined direction, a first end and a second end, said first end being disposed at said original position of said surface element, said transformation such that said original peripheral surface elements are transformed to new interior surface elements and certain of said original interior surface elements are transformed to new peripheral surface elements;

removing discontinuities in said new interior surface elements, resulting in a transformed tessellatable surface; and, tessellating said transformed tessellatable surface.

2. The method of claim 1 wherein the first tessellatable surface comprises a regular geometric shape.

3. The method of claim 2 wherein the first tessellatable surface comprises a rectangular shape.

4. The method of claim 1 wherein the first tessellatable surface comprises a tessellatable of a plurality of copies of a second tessellatable surface.

5. The method of claim 4 wherein the second tessellatable surface comprises a rectangular shape.

6. The method of claim 5 wherein the first tessellatable surface comprises a two-by-two array of copies of said second tessellatable surface.

7. The method of claim 1 wherein the surface elements of the first tessellatable surface comprise pixels representing elements of an image.

8. The method of claim 7 wherein said first tessellatable surface comprises a rectangular array of said pixels.

9. The method of claim 8 wherein said displacement vector comprises a vertical and a horizontal component.

10. The method of claim 9 wherein said rectangular array of said pixels comprises a first predetermined number of rows of pixels and a second predetermined number of columns of pixels.

11. The method of claim 10 wherein said first number is equal to said second number.

12. The method of claim 11 wherein said vertical component of said displacement vector is equal in length to said horizontal component of said vector.

13. The method of claim 10 wherein said horizontal component of said displacement vector has a length equal to one half of the length of one-half of said second predetermined number of pixels and said vertical component is equal to the length of one-half of said first predetermined number of pixels.

14. A method of forming a surface such that a tesselation of said surface is borderless, said method comprising the steps of:

generating an image of a surface texture;

digitizing said image and storing said image in a storage means, said image comprising a plurality of original interior pixels and a border of a plurality of original peripheral pixels;

translating a position of each of said pixels such that said original peripheral pixels are disposed as new interior pixels and certain of said original interior pixels are disposed as new peripheral pixels, said translation such that discontinuities are created in the region of said new interior pixels; and, removing said discontinuities to create a continuous tessellatable surface.

15. The method of claim 14 wherein said step of generating an image comprises producing a photograph of a texture sample, said photograph having between approximately a 5:1 and an 8:1 size correspondence with said texture sample.

16. The method of claim 14 wherein said step of digitizing said image comprises scanning said image and converting said image to a pixel array.

17. The method of claim 16 wherein said pixel array comprises a 512 by 512 pixel array.

18. The method of claim 14 wherein said step of translating said pixels comprises defining first, second, third, and fourth quadrants in said image, said quadrants each having first and second complementary interior edges and first and second exterior edges;

transposing said first and third quadrants;

transposing said second and fourth quadrants; and, said transposing steps such that said complementary interior edges are disposed on the periphery of said image and said exterior edges are disposed on an interior of said image.

19. A method of forming a surface such that a tesselation of said surface is borderless, said method comprising the steps of:

generating an image of a surface texture;

digitizing said image and storing said image in a storage means, defining first, second, third, and fourth quadrants in said image, said quadrants each having first and second complementary interior edges and first and second exterior edges;

transposing said first and third quadrants;

transposing said second and fourth quadrants;

said transposing steps such that said complementary interior edges are disposed on the periphery of said image and said exterior edges form a region of discontinuities in the interior of said image; and, removing said discontinuities to create a continuous tessellatable surface.

20. The method of claim 19 wherein said first, second, third, and fourth quadrants are of equal size.

21. The method of claim 19 wherein said step of digitizing said image comprises scanning said image and converting said image to a pixel array.

22. The method of claim 21 wherein said pixel array comprises a 512 by 512 pixel array.

* * * * *